O. ZANCAN.
VEHICLE TIRE.
APPLICATION FILED MAR. 27, 1917. RENEWED AUG. 8, 1919.
1,320,518.
Patented Nov. 4, 1919.
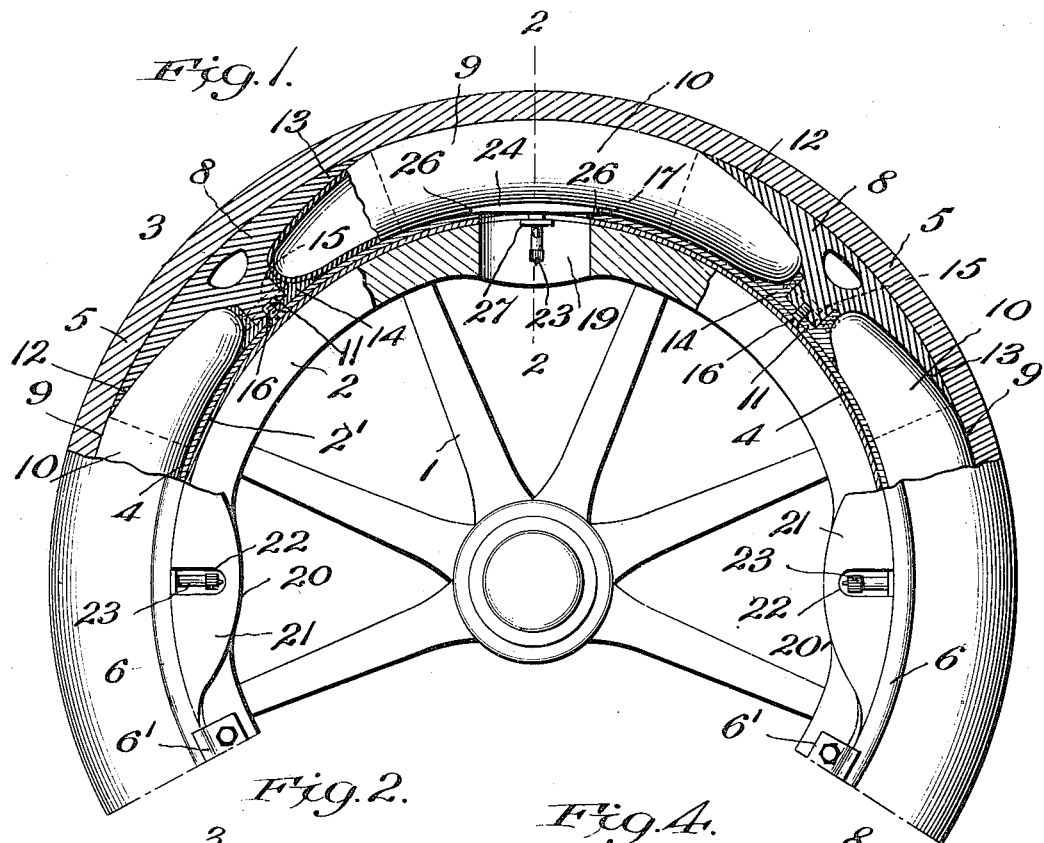
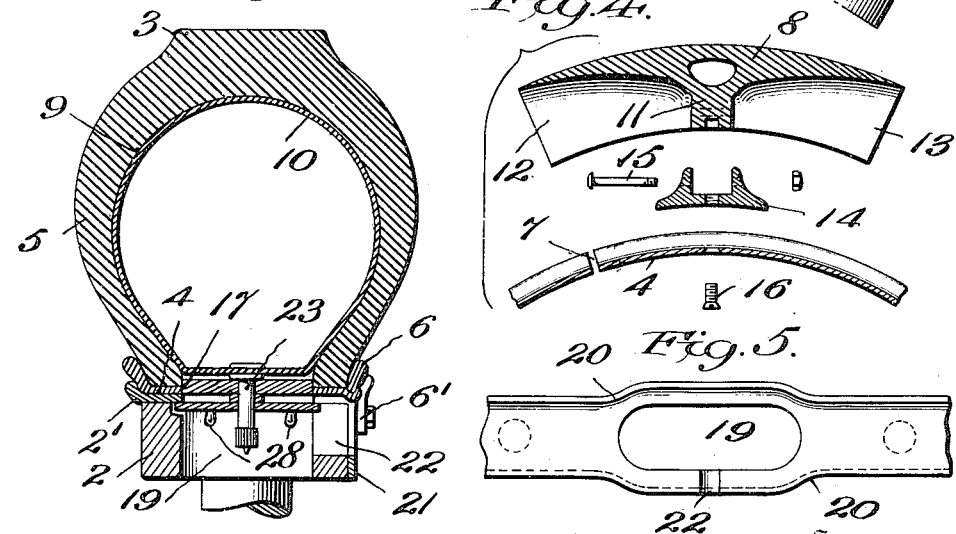
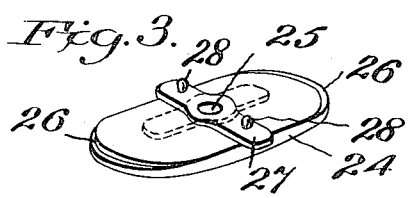
Inventor
Ottavio Zancan,
By his Attorney
Geo. H. Byrne.

UNITED STATES PATENT OFFICE.

OTTAVIO ZANCAN, OF NEW YORK, N. Y.

VEHICLE-TIRE.

1,320,518. Specification of Letters Patent. Patented Nov. 4, 1919.

Application filed March 27, 1917, Serial No. 157,600. Renewed August 8, 1919. Serial No. 316,215.

*To all whom it may concern:*

Be it known that I, OTTAVIO ZANCAN, a subject of the King of Italy, and resident of New York city, in the county of New York and State of New York, have invented certain new and useful Improvements in Vehicle-Tires, of which the following is a specification.

This invention relates to pneumatic tires for vehicle wheels and has for its general object to provide a tire formed of a series of independent and detachable inner tube sections, so arranged that any one may be readily removed and replaced without disturbing the remaining sections.

Another object of the invention is to provide a tire of this character which may be readily removed and replaced on the felly of the wheel without deflating the tube sections. And to these ends the invention resides in forming a tire of this class, comprising a demountable rim to which is secured the outer casing and a series of partitions are detachably secured to the rim and arranged within the casing for forming compartments within which are disposed a series of pneumatic tubes.

To these ends the invention further consists in the novel details of construction and combination of parts more fully hereinafter described, and particularly pointed out in the claims.

Referring to the drawings forming a part of this specification, in which like numerals designate like parts in all the views—

Figure 1 is a view of a segmental portion of a vehicle wheel partly in section and partly in elevation, and showing my improved tire secured thereto.

Fig. 2 is a cross sectional view taken on the line 2—2 of Fig. 1.

Fig. 3 is a detail perspective view of the cover for the opening in the tire rim.

Fig. 4 is a longitudinal sectional view of a portion of the demountable rim, one of the partitions, and the means for securing the partition to the rim, all of the parts being separated for the sake of clearness, and, Fig. 5 is a plan view of the outer face of a portion of the felly rim.

Heretofore, in such types of tires, it has been proposed to provide the outer casing with a plurality of interior arranged partition walls which are formed integrally with the casing. By such construction it is obvious that specially constructed molds have to be employed in the manufacture of casings of this type, which necessitates an added expense both to the manufacturer and the consumer, which obviously could be eliminated if casings of the well known types in use today could be used in connection with tires of this type.

By my invention I provide an improved tire in which the partitions are secured to the rim of the tire so that the usual type of shoe or casing may be used, and by detachably securing the partitions to the rim the partitions may be readily removed and the ordinary type of single tube substituted for the series of tubular sections.

Referring now to the drawings in detail, the reference numeral 1 designates the wheel, 2 the felly provided with the rim 2″ and 3 the tire secured thereon.

The tire may be formed of any of the well known substances now employed in the manfacture of tires, such as rubber, or a combination of rubber and canvas, and comprises the usual form of demountable rim 4, to which is secured the outer shoe or casing 5. Any suitable well known means may be employed for detachably securing the casing to the rim, but for the purpose of illustration I have shown the rim provided at one side with the usual form of locking ring 6 which coöperates with the rim, as shown, to secure the casing thereon. The usual type of clamps 6' mounted on one side of the felly and engaging the rim of the tire are provided for securely locking the tire to the felly. The rim is split as designated by the numeral 7 in Fig. 4, which permits of the rim being contracted so as to facilitate the ready removal and replacing of the casing when desired.

A series of radially directed partitions 8 are secured to the rim 4 and are arranged within the casing an equal distance apart for forming a series of compartments 9 for receiving independent pneumatic tubes 10. These partitions are preferably formed of a suitable resilient material, such as rubber, and comprise the central or base portion 11, from which project the lateral extending outwardly flared cone-shaped portions 12 and 13, into which the ends of the adjacent tubes 10 fit.

The walls of portions 12 and 13 decrease in thickness from the base or web portion 11 toward the outer end of the partition or element, these walls being located on the outer sides of the partition element, giving the somewhat cone-shape referred to. As a result each partition is formed with depressions which decrease in cross-section toward the bottom of the depression.

These partitions are preferably formed of the shape as shown, so as to be of sufficient rigidity to hold the inner tubes in their respective positions, but still retain sufficient resiliency to prevent vibration when the tread of the casing where they are located contacts with the ground.

Any suitable means may be employed for detachably securing the partitions 8 to the rim 4 but for the purpose of illustration I have shown attaching pieces or brackets 14 for each of the partitions. These brackets are secured to the central or base portions of the partitions by means of bolts 15, and by means of screws 16 passing through the rim 4 and screwing into the base of the brackets the partitions are secured to the rim.

Manifestly, by constructing the tire of a series of independent pneumatic tubes, the deflation by puncture of any section will not affect or disturb the condition of the other sections. When the casing or shoe is adjusted into position on the rim 4, the tubes before being inflated may be introduced into their respective compartments by passing them through openings 17 formed in the rim.

As shown, the felly 2 and its rim 2' are also provided with alining openings 19, which aline with the opening 17, formed in the rim 4, to permit the insertion of a pneumatic tube therethrough where the tire is on the wheel.

To strengthen that portion of the felly through which the openings 19 are cut, it will be noted that the sides and inner faces of the felly are enlarged, as indicated at 20, and that the felly is further reinforced at one side thereof and adjacent to said openings by means of the portions 21, bent up from the felly rim 2'.

To permit the tire to be removed and replaced on the wheel, lateral openings 22 are provided in the enlarged portions of the felly and rim, as shown, through which the inflation nipples 23 of the pneumatic tubes pass.

The openings 17 of the rim 4 are closed by means of covers 24, which are provided with perforations 25, through which the inflation nipples 23 pass and are exposed for connection to the ordinary inflation apparatus. These covers are inserted into the compartments 9, together with the tubes 10, and are then adjusted so that the cut-away portions 26 on their opposite ends engage with the edges of the rim 4 as shown in Fig. 1. When the covers have been adjusted to their proper positions, the keepers 27 secured thereto are then swung around by gripping the knobs 28, so that the free ends of the keepers will engage with the side edges of the felly rim, as shown in Fig. 2. Suitable covers may be provided for closing the openings in the felly so as to prevent the accumulation therein of dirt or other substances.

Owing to the fact that the spaced-apart partitions are each independently secured to the rim, each is practically fixed as to position in the direction of length of the casing and unaffected in position by any action of the casing while the wheel is in use. This permits of the employment of inflatable units 9 of considerable length, the ends of each unit being practically anchored against movement lengthwise of the casing by the walls of the partition depressions. Each unit is therefore unaffected by an adjacent unit, these being separated by the web 11 which, with the outer walls of the partition provide a protecting feature to the unit which aids in increasing the life of the unit.

As will be readily understood, the partitions and units do not require any special form of casing, the latter simply overlying the partitions and units, the latter being practically carried by the rim—the form of mounting of the unit within the partitions practically locking the units to the rim while the units are inflated.

As will be obvious, the general arrangement is especially adapted for service in connection with demountable rim structures, since the partitions are secured to the rim and are not affected by the removal or insertion of a unit. But inasmuch as the units can be inserted or removed while the parts are in position, as heretofore pointed out, it will be obvious that the invention is not limited to use with rims of the demountable type.

From the foregoing, it is obvious that it will not be necessary to demount the tire from the wheel in the event of one of the tube sections becoming deflated by puncture or otherwise because, in the event of such deflating, the tube may be readily removed after first disengaging the keeper and removing the cover, whereupon the defective tube may be drawn through the alined openings 17 and 19 by pulling on the nipple of the tube.

It is obvious that those skilled in the art may vary the details of construction and arrangement of parts without departing from the spirit of my invention, and, therefore, I do not wish to be limited to such features, except as may be required by the claims.

What I claim is—

1. In a vehicle tire of the multi-chamber type, and in combination a rim having openings, perforated covers arranged for closing the openings, means mounted on the covers and co-acting with the rim for locking the covers against displacement, an outer casing, detachably secured to the rim, a series of brackets detachably secured to the rim, a series of resilient partitions detachably secured to the brackets and arranged within the casing for forming compartments therein and a series of tubes disposed within said compartments and having nipples extending through the perforations in the covers.

2. The combination with a wheel having a felly provided with openings, of a tire of the multi-chamber type detachably secured to the felly and comprising a demountable rim provided with openings registering with the openings in said felly, an outer casing detachably secured to the rim, perforated covers arranged for closing the openings in the rim, means mounted on the covers and co-acting with the felly for locking the covers against displacement, a series of partitions detachably secured to the rim and arranged within the casing for forming compartments therein and a series of pneumatic tubes disposed within said compartments and having nipples extending through the perforations in the covers, whereby said tire is adapted to be removed and replaced on the felly when the tube sections are inflated.

3. The combination with a wheel having a felly provided with openings in the sides of the felly, of a tire of the multi-chamber type detachably secured to the felly and comprising a demountable rim, an outer casing, a series of brackets detachably secured to the rim, a series of resilient partitions detachably secured to the brackets and arranged within the casing and having laterally extending outwardly flared cone-shaped portions, a series of pneumatic units arranged in the compartments provided by said partitions and having their ends arranged within said flared portions, said tubes having nipples extending into the openings of the felly whereby said tire may be removed and replaced on the felly when the tube sections are inflated.

4. In a vehicle tire of the multi-chamber type, a rim, a plurality of partitions removably secured to the rim in spaced-apart relation, an annular casing removably secured to the rim and overlying the partitions, and a plurality of inflatable units anchored in position by the partitions, adjacent units being permanently spaced apart by the partitions.

5. In a vehicle tire of the multi-chamber type, a rim having openings equi-spaced in its direction of length, a plurality of spaced-apart partitions removably secured to the rim at points intermediate adjacent openings, an annular casing removably secured to the rim and overlying the partitions, and a plurality of independent inflatable units anchored in position by the partitions, said units overlying the rim openings and being removable or insertible therethrough.

6. In a vehicle tire of the multi-chamber type, a rim, a plurality of partitions removably secured to the rim in spaced-apart relation, each partition having its front and rear ends formed with depressions decreasing cross-sectionally toward the bottom of the depressions, a casing removably secured to the rim and overlying said partitions, and removable inflatable units anchored in position by said partitions, each unit being located between adjacent partitions and having its ends of a configuration to fit within the opposed depressions of such partition when the unit is inflated.

7. In a vehicle tire of the multi-chamber type, a rim having openings equi-spaced in its direction of length, a plurality of spaced-apart partitions removably secured to the rim at points intermediate adjacent openings, an annular casing removably secured to the rim and overlying the partitions, and a plurality of independent inflatable units anchored in position by the partitions, said units overlying the rim openings and being removable, in combination with a wheel having a felly to receive the rim, said felly having openings complemental to the rim openings to permit removal or insertion of a unit therethrough.

8. In a vehicle tire of the multi-chamber type, a rim having openings equi-spaced in its direction of length, a plurality of spaced-apart partitions removably secured to the rim at points intermediate adjacent openings, an annular casing removably secured to the rim and overlying the partitions, and a plurality of independent inflatable units anchored in position by the partitions, said units overlying the rim openings and being removable or insertible therethrough, in combination with a wheel having a felly to receive the rim, said felly having openings complemental to the rim openings to permit removal or insertion of a unit therethrough, said felly also having lateral passageways to permit of the passage of the unit inflating nipples, whereby the rim and the parts carried thereby may be removed bodily from the felly while units are inflated.

Signed at New York city, in the county of New York and State of New York, this 24th day of March, A. D. 1917.

OTTAVIO ZANCAN.

Witnesses:
OSCAR CARLBERG,
CORNELIA G. THOMPSON.